United States Patent
Pielkenrood et al.

[15] 3,666,111
[45] May 30, 1972

[54] SEPARATION DEVICE

[72] Inventors: Jacob Pielkenrood; Willem L. B. Ambrosius, both of Krommenie, Netherlands

[73] Assignee: Pielkenrood-Vinitex N.V., Assendelft, Netherlands

[22] Filed: June 18, 1970

[21] Appl. No.: 47,575

[30] Foreign Application Priority Data

June 28, 1969 Netherlands..........................6909973
Sept. 29, 1969 Netherlands..........................6914731

[52] U.S. Cl..........................................................210/521
[51] Int. Cl.........................................................B01d 21/02
[58] Field of Search....................210/521, 522, 532, 83, 519

[56] References Cited

UNITED STATES PATENTS 2,673,451  3/1954  Gauel................................210/521 X

FOREIGN PATENTS OR APPLICATIONS 526,361  2/1954  Belgium................................210/521

Primary Examiner—J. L. DeCesare
Attorney—Bayard H. Michael

[57] ABSTRACT

A separation device comprising substantially parallel sloping passages in an assembly of corrugated bordering surfaces with tops and valleys for separating heavier and/or lighter components from a carrier liquid by supplying the liquid to be treated at one end of this assembly, the heavier components sinking into the valleys and/or the lighter components rising into the tops of said passages. This device is provided with mutually parallel guiding partitions at least at the supply side of this assembly, between which partitions transverse plates of alternately different slope are provided for delimiting mutually separated channels communicating with the tops or the valleys of said passages respectively, in order to suppress turbulences in the liquid and preventing remixing of the separated substances. Auxiliary partitions may be provided for improving the liquid distribution and/or for classification of the separated substances.

21 Claims, 11 Drawing Figures

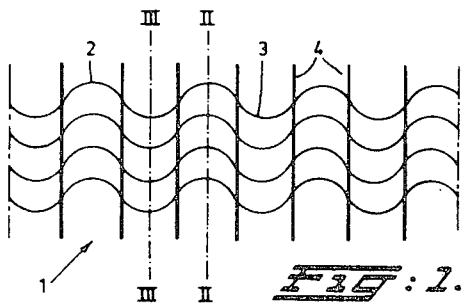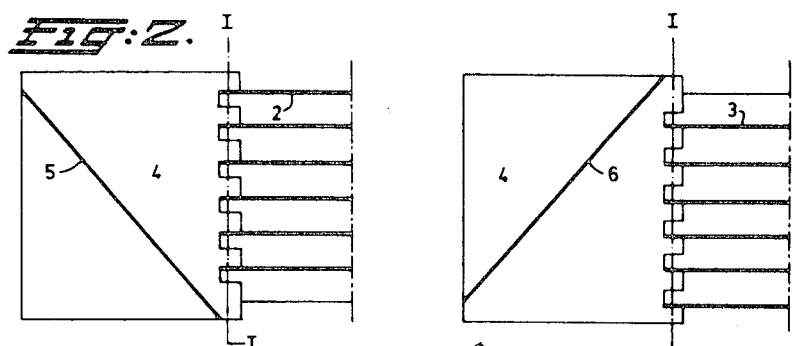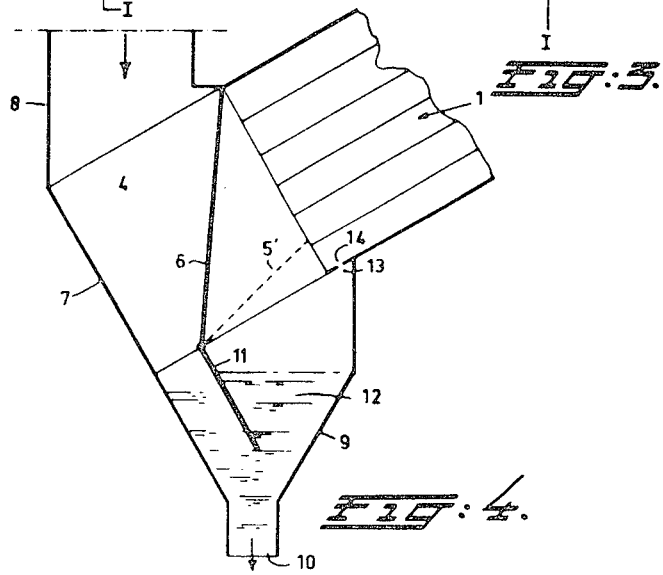

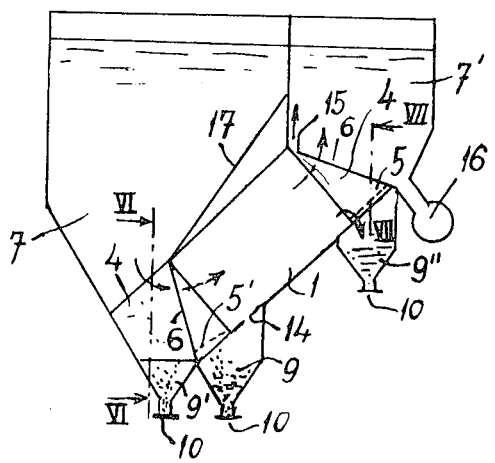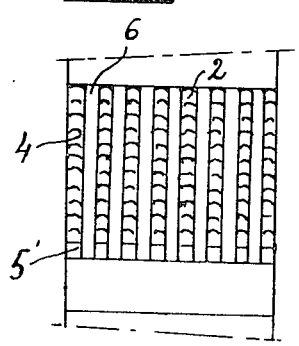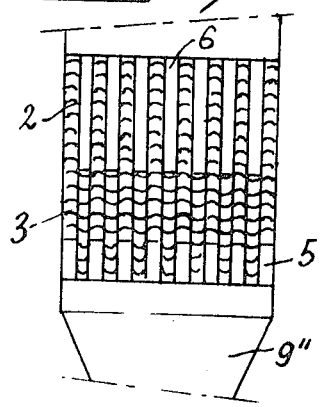

PATENTED MAY 30 1972 3,666,111

INVENTORS
JACOB PIELKENROOD
WILLEM L.B. AMBROSIUS
BY
Bernard H. Michael
ATTORNEY

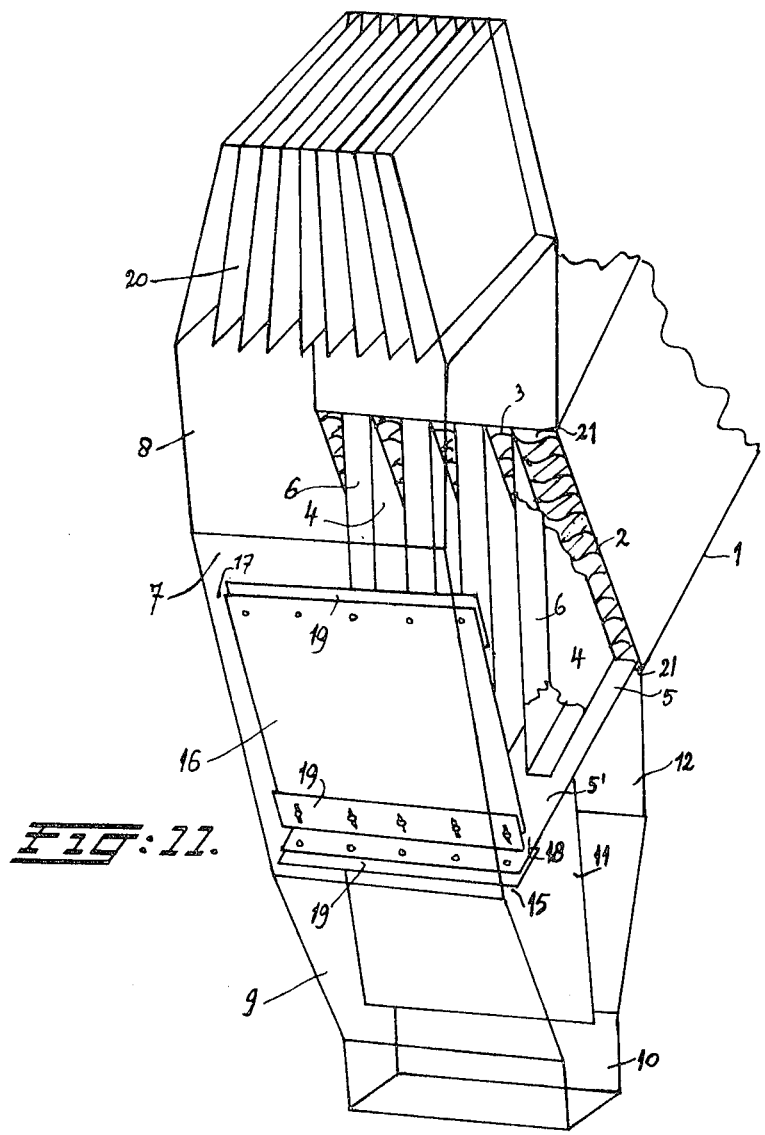

3,666,111

SEPARATION DEVICE

BACKGROUND OF THE INVENTION

The invention relates to a separation device comprising separation passages with longitudinally extending tops and valleys, and a set of substantially vertical guiding ducts interconnecting the tops or valleys of successive passages.

SUMMARY OF THE INVENTION

From French Pat. No. 1 064 620 and U.S. Pat. No. 3,346,122 plate separators of this kind are known, which, at their lower end, are provided with sediment discharge ducts or gutters communicating with the valleys of the separation passages. In these prior devices it is still not possible to suppress turbulences in the liquid completely, and, thus, to prevent remixing of the separated substances with the supplied liquid.

It is an object of the invention to provide a device of this kind, in which the turbulences at the supply and discharge sides may be effectively suppressed.

To that end the device according to the invention is characterized by two sets of ducts at the same side of the separation assembly, the ducts of one set lying between those of the other set, and having, more specifically, a different direction.

The guiding ducts according to the invention may be varied in many different manners in order to adapt the device to different circumstances. Moreover these guiding ducts may be supplemented by other guiding partitions for suppressing remixing and obtaining a complete separation between the components or different parts of one component.

BRIEF DESCRIPTION OF THE DRAWINGS

FIG. 1 shows a cross-section along the line I—I of FIGS. 2 and 3 of an embodiment of a separation device according to the invention;

FIGS. 2 and 3 show cross-sections along the lines II—II and III—III, respectively, of FIG. 1;

FIG. 4 shows a diagrammatical cross-section of a special embodiment of such a device;

FIG. 5 shows a diagrammatical cross-section of another embodiment of the invention;

FIGS. 6 and 7 show cross-sections along the lines VI—VI and VII—VII, respectively, of FIG. 5;

FIG. 11 shows a diagrammatical isometric view of the device of FIG. 8, in which some delimiting walls are drawn as transparent ones, and some parts are partly broken away.

DESCRIPTION OF THE PREFERRED EMBODIMENTS

Figure 8:
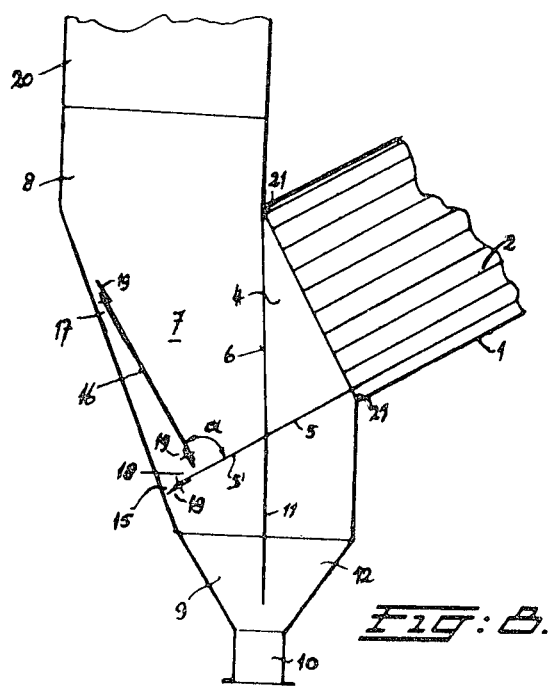
FIG. 8 shows a diagrammatical cross-section through a part of still another embodiment of the invention.

The separation device shown in FIGS. 1 . . . 3, which is, for example, intended for separating in counter-current a heavy component suspended in a liquid, comprises an assembly 1 of corrugated plates with tops 2 and valleys 3 of known shape. At one end guiding partitions 4 are arranged which, in the position of normal use, are substantially vertical, which partitions engage the plates 1 substantially midway between a top and a valley of the corrugations.

Between the partitions 4, alternating transverse plates 5 and 6, respectively, are provided which, in the example shown, have an opposite slope in respect of the terminal plane of the assembly 1. The transverse plates 5 are directed upwards and join the tops 2, and the plates 6 are directed downwards and join the valleys 3.

When a liquid with a heavy component suspended therein is supplied to those interspaces between the partitions 4 which are closed by the transverse plates 5, the liquid will enter the assembly 1 between the tops of the corrugated plates. The heavy component precipitating between these plates lands in the valleys 3 of the corrugations, and flows down into those interspaces between the partitions 4 which are closed by the transverse plates 6.

In this manner a complete separation between the different flows may be obtained, and, more specifically, remixing of the heavy component with the liquid by turbulences is prevented.

The transverse plates 5 and 6 may also be curved if this will favorably influence the flow distribution, and also adjustable transverse plates may be used if this is required for an adaptation to different flow conditions.

Also at the other side of the plate assembly 1 a corresponding set of guiding partitions 4 may be provided if it is required for separating a lighter component, in which case in the interspaces joining the tops upward directed transverse plates may be arranged. In a plate assembly which is mainly designed for separating a lighter component, a separation will be brought about in counter-current when the liquid is supplied at the upper end of the assembly, in which case the liquid flow supplied is directed towards the valleys at that end by means of transverse plates 6 in the manner of FIGS. 2 and 3, and the lighter component will be discharged upward by means of plates 5 joining the tops.

FIG. 4 shows a diagrammatical cross-section of a separation device according to the invention intended for separating heavier components from a suspension. The parts of this device corresponding with the parts of the embodiment of FIGS. 1 . . . 3 indicated by the same reference numerals.

The plate assembly 1 with the partitions 4 communicates with a supply chamber 7 provided with a supply duct 8, which chamber, at its lower end, merges with a sediment collecting chamber 9 provided with a collecting duct 10. The chambers 7 and 8 are, more specifically, formed by parts separated from a larger tank in which also the plate assembly 1 is positioned. The partitions 4 joining the plate assembly extend up to the terminal wall of the chamber 7.

The transverse plates 6 lying in the interspaces connected to the valleys 3 are directed towards the collecting chamber 9. As an extension thereof a partition wall 11 is provided which is submerged in the sediment collected in the chamber 9. Transverse plates 5' correspond with the plates 5 of FIGS. 1 . . . 3, but have a downward slope which is, however, smaller than the slope of the plates 6.

The liquid which is supplied at 8 flows downwards between the partitions 4. A part of the heavier component precipitates already in the chamber 7, assisted by the downward flow, and settles down in the collecting chamber 9 before the partition wall 11. A part of the sediment slides down along the plates 5'. The liquid flows on towards the interspaces between the tops of the plates of the assembly 1, and the sediment precipitating there lands in the valleys 3, sliding downwards therein, and finally arriving in the chamber 9 at the other side of the wall 11.

Experiments have shown, that, when the wall 11 is absent, substantial turbulences may occur, causing a part of the sediment to be remixed with the liquid, which may then even be carried back into the valleys 3. By means of the wall 11 the presediment is separated from the sediment precipitating between the plates 1, and the turbulences are suppressed, so that a better separation is obtained. Furthermore the partition wall 11 forms, when submerged in the sediment, a lock between the supply chamber 7 and the discharge end of the plate assembly 1, so that a short-circuit between the supply and the discharge ends of the valleys 3 of the assembly 1 is prevented, since the flow resistance from the supply side and along this wall towards the valleys is substantially higher than that of the direct path towards the tops. By a suitable adjustment a divergence behind the constriction near the lower end of the plates 6 may be obtained, so that, by the ensuing retardation of the flow, the precipitation is enhanced.

The partition wall 11 may be adjustably mounted, in order to be able to obtain an optimal adjustment of the flow distribution, and, moreover, an adjustable extension piece may be arranged for changing the immersion depth. It is often possible to suspend this wall more or less freely movable, so that it may adjust itself in the optimal position.

When also by the downward constriction of this chamber the water is expelled from the sediment and rises, it may be possible that it remains stagnant in the dead angle 13 below the assembly 1. Therefore holes 14 will be provided in the valleys allowing this water to be discharged upwards.

In this manner a very effective separation of dense suspensions, for instance waste water, may be obtained. It will be clear that for separating a lighter component dispersed in a liquid the device of FIG. 4 may be modified in such a manner that the liquid is supplied at the higher end of the assembly 1, for instance as an upward flow supplied from below, in which a certain separation may already take place, after which the flow is led to the valleys by means of suitable guide plates, so that the lighter component separated between the plates will rise along the tops towards the higher part of the assembly and then is guided upwards by means of suitable guiding plates.

Instead of separating passages bordered by corrugated plates, the device according to the invention may also comprise troughs, tubes or similar means.

The embodiment of FIGS. 5 . . . 7 differs, in the first place, from that according to FIG. 4 in that in front of the chamber 9 a second sedimentation chamber 9' is provided, communicating with the passages between the partitions 4 which are directed towards the tops and are closed at the lower side by the plates 5'.

The larger particles precipitating already in the downward flow in the supply chamber will, then, settle in the sedimentation chamber 9', and thus remain separated from the finer particles which are only separated in the passages of the assembly 1 and are returned to the chamber 9.

At the other extremity of the assembly 1 corresponding partitions 4 are provided, and the passages between these partitions communicating with the tops are closed at the lower side by upwards sloping transverse plates 5, which passages open into a discharge chamber 7'. The passeges communicating with the valleys are closed by downward sloping transverse plates 6, and open at the lower end into a discharge chamber 9''.

The finer particles which are separated only at the end of treir movement through the assembly land in the valleys and subsequently flow into the sedimentation chamber 9''. The latter is, at the upper end of the plate 6, provided with an aperture 15 through which the surplus liquid separated in this chamber may escape.

The liquid flowing from the tops into the discharge chamber 7' is substantially free of all heavier particles. If, however, some sedimentation occurs in this chamber, it is collected at the lower end, where a discharge duct 16 is provided in order to prevent soiling of the discharge chamber.

In order to obtain the most favorable flow conditions for sedimentation, a guide plate 17 is provided which brings about the desired narrowing of the supply chamber.

The embodiment according to FIGS. 8 . . . 11 differs from that of FIG. 4 in that the transverse plates 5, beyond the transverse plate 6, join a common extension plate 5' extending up to a short distance from the opposing terminal wall of the supply chamber 7, a relatively narrow aperture remaining free between the edge of this plate en said terminal wall. Furthermore an auxiliary partition 16 is positioned at an angle $\alpha$ of at least 90° with the extension plate 5' and at a short distance of the terminal wall of the chamber 7, so that at the upper side a relatively narrow passage 17 is provided, while, at the lower side, a relatively narrow passage 18 remains between the edge of this partition 16 and the transverse plate 5'.

The liquid flow from the supply duct 8 is maintained substantially free of turbulences between the partitions 4 and 16, and some precipitation of heavier components may already occur, the sediment being removed towards the sedimentation chamber 9, partly between the terminal wall of the chamber 7 and the partition 16, and partly along the plate 5' and through the passage 15. The sediment from the assembly 1 slides down along the valleys, and, finally, arrives in the channels bordered by the partitions 4 and the plates 6, and, subsequently, in the part 12 of the collecting chamber 9, the partition 11 again preventing an unwanted interaction between the supply and discharge sides. In some cases it may be necessary to lengthen the partitions 4 up to the partition 16.

The partitions 11 and 16 and the plate 5' should sealingly join the side walls and may be fixed to these side walls, and the plates 5 may also be partly supported by the assembly 1.

It will be clear that the size of the passages 15, 17 and 18 will depend on the character of the sediment. When the device should be used for various kinds of suspensions, it is advisable to define these passages by means of adjustable strips 19.

In order to obtain a non-turbulent input flow, it is generally required to suppress the turbulences already in the supply duct 8. As shown in FIG. 11 auxiliary partitions 20 may be used to that end, which, in the case shown, are arranged in a diverging part of the supply duct 8, the arrangment of these partitions substantially corresponding with that of the partitions 4, and, furthermore, being adapted to the shape of this duct. These partitions 20 terminate at some distance from the supply chamber 7, a stabilizing space lying between this end and the latter chamber. The diverging supply duct 8 shown will reduce the flow speed, which favors the stabilization of the flow. The cross-section at the entry of the assembly 1 is smaller again, so that, there, the liquid flow is accelerated again.

It is, however, not absolutely necessary to use a diverging duct 8. Finally it is advisable not to use the passages delimited by a wall of the assembly 1 for separation and to close them by means of a suitable transverse wall 21.

Figure 9:
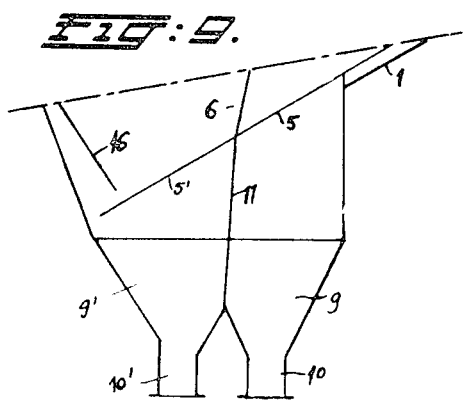
FIG. 9 shows a partial cross-section of a modification of the embodiment of FIG. 8.
Figure 10:
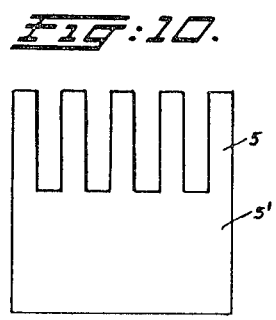
FIG. 10 shows a plan view of a transverse plate of the device of FIGS. 8 or 9.

FIG. 9 shows a modification of a part of FIG. 8, corresponding with the embodiment of FIG. 5.

The device of FIG. 8 . . . 11 is intended for separating heavier components from a carrier liquid. For separating lighter components an oppositely sloping assembly 1 is used, the supply taking place at the upper end of the valleys of the passages in this assembly. In that case the plates 5 are positioned at the upper side of the partitions 4, and the transverse plates 6 now joining the tops of the passages are directed upwards.

It is also possible to arrange similar partitions at both sides of the assembly 1, the shape of which depending on the character of the separated substances.

The arrangement according to FIG. 5 (which also applies to the other Figures) in which the supply chamber 7 extends above the upper wall of the assembly 1 or the plate 17, has the advantage that the discharge chamber 7' does not comprise a pocket above this assembly in which sedimentation may take place, as is the case in many prior devices, especially those in which the separation assembly is supported on hinges and may be rotated into a substantially vertical position for cleaning purposes. In the case of FIG. 5 the assembly may be hingedly supported on its lower transverse edge and be rotated into the chamber 7. The transverse wall separating the chambers 7 and 7' may, then, form a unit with the assembly 1. Another advantage is that, when filling the device with liquid, the static pressures in the chamber 7 and in the assembly 1 are almost equal, so that the relatively thin walls of this assembly will not be damaged as in the case of many prior devices with a pocket above the assembly which is part of the discharge chamber, and which is filled only after the supply chamber is filled.

Within the scope of the present disclosure many other modifications are possible.

We claim:
1. A device for separating components from a mixture of substances including a liquid carrier comprising
   a basin for receiving said mixture;
   a separation assembly positioned in said basin;
   said separation assembly including
   a plurality of vertically spaced corrugated means with the tops and valleys of vertically adjacent corrugated means being superposed and defining a plurality of longitudinally extending flow passages;

a plurality of first duct means defining a flow passage generally normal to said longitudinal flow passage connected to one end of said corrugated means in spaced relationship so each interconnects the valleys of vertically adjacent corrugated means in liquid communication, the cross-sectional area of said first duct means gradually increasing in the downward direction; and a plurality of second duct means defining a flow passage generally normal to said longitudinal flow passages connected to said corrugated means between said first duct means so each interconnects the tops of vertically adjacent corrugated means in liquid communication, the cross-sectional area of said second duct means gradually increasing in the upward direction.

2. The device according to claim 1 wherein said first and second duct means comprise a plurality of parallel vertical partitions connected to one end of said corrugated means between a top and a valley;

a downward sloping transverse plate connected between first adjacent pairs of said partitions, which embody the valleys of said corrugated means, to form said first duct means; and an upward sloping transverse plate connected between second adjacent pairs of said partitions, which embody the tops of said corrugated means, to form second duct means.

3. The device according to claim 2 wherein the slope of said transverse plates is curvate.

4. The device according to claim 2 including means for adjusting the slope of said transverse plates.

5. A device for separating components from a mixture including at least one substance suspended in a liquid carrier comprising a basin having a sedimentation chamber;

a supply conduit in communication with the upper portion of said sedimentation chamber for introducing said suspension;

a sediment collection means in communication with the lower portion of said sedimentation chamber in which sediment precipitating from said suspension can be collected;

a separation assembly positioned in said basin at an angle to the vertical and spaced from one side wall of said sedimentation chamber, the lower end of said separation assembly being in communication with said sedimentation chamber and said sediment collection means and including a plurality of vertically spaced corrugated means with the tops and valleys being superimposed and defining a plurality of generally longitudinal flow passages;

a plurality of parallel vertical guide partitions positioned in said sedimentation chamber in spaced relationship, one side of said guide partitions being connected to the lower end of said corrugated means between a top and a valley with the opposite side being connected to a side wall of said sedimentation chamber, so that, suspension introduced through said supply conduit enters between the upper ends of said guide partitions and sediment, precipitated from the suspension, is discharged between the lower ends of said guide partitions into said sediment collection means;

first transverse plate means connected between pairs of adjacent guide partitions embodying the valleys of vertically adjacent corrugated means to define a first duct means, said first plate means extending downwardly and diagonally from the top of said separation assembly towards said side wall of the sedimentation chamber so that flow of sediment from said valleys is directed into a first portion of said sedimentation collection means; and second transverse plate means connected between pairs of adjacent guide partitions embodying the tops of vertically adjacent corrugated means to define second duct means, said second transverse plate means extending diagonally from the bottom portion of the lower end of said separation assembly toward said side wall of said sedimentation chamber so that flow of sediment, precipitating from said suspension in said sedimentation chamber prior to entry into said separation assembly, is directed into a second portion of said sediment collection means.

6. The device according to claim 5 including means separating first and second portions of said sediment collection means to suppress turbulence in said sediment chamber.

7. The device according to claim 6 wherein said sediment collection means is a single chamber and said separation means comprises a partition extending from the lower end of said plate means downwardly into said sediment collection chamber to separate said first and second portions thereof.

8. The device according to claim 7 wherein said separation partition is adjustably mounted with respect to said sediment collection chamber so that the cross-sectional area of the flow passage defined between said separation partition and a side wall of said sediment collection chamber can be varied.

9. The device according to claim 8 wherein said separation partition is pivotally mounted with respect to said sediment collection chamber so that the cross-sectional area of the flow passage defined thereby can be automatically adjusted by flow.

10. The device according to claim 7 wherein said separation partition includes an adjustable extension.

11. The device according to claim 6 wherein said first and second portions of said sediment collection means and said separation means comprise separate sediment collection chambers which are physically separated from each other.

12. The device according to claim 11 including a third sediment collection chamber and a discharge chamber, both of which are in communication with the upper end of said separation assembly;

third duct means connected to the upper end of said corrugated means directing flow of any sediment from said valleys into said third sediment collection chamber; and fourth duct means connected to the upper end of said corrugated means directing flow from said tops into said discharge chamber.

13. The device according to claim 12 wherein said third duct means includes an opening in the top portion through which liquid can be discharged from said valleys into said discharge chamber.

14. A device for separating components from a mixture including at least one substance suspended in a liquid carrier comprising a basin having a sedimentation chamber;

a supply conduit in communication with the upper portion of said sedimentation chamber for introducing said suspension;

sediment collection means in communication with the lower portion of said sedimentation chamber in which sediment precipitating from said suspension is collected;

a separation assembly positioned in said basin at an angle to the vertical and spaced from one side of said sedimentation chamber, the lower end of said separation assembly being in communication with said sedimentation chamber and sediment collection means and including a plurality of vertically spaced corrugated means with the tops and valleys thereof superimposed and defining a plurality of generally longitudinal flow passages;

a plurality of duct means, defining a flow passage generally normal to said longitudinal flow passages, connected to the lower end of said corrugated means in spaced realtionship so each interconnects the valleys of vertically adjacent corrugated means and directs flow of sediment from said valleys into a first portion of said sediment collections means;

a transverse plate arranged at a downward slope within said sedimentation chamber, said transverse plate having fingers at its upper end, which extend between said duct means to the bottom portion of the lower end of said separation assembly, with the opposite end being spaced from the outer wall of said sedimentation chamber to define a first narrow flow passage from said sedimentation chamber into a second portion of said sediment collection means.

15. The device according to claim 14 including an auxiliary partition within said sedimentation chamber and positioned above said transverse plate at an angle of at least 90° with respect thereto, the upper end of said auxiliary partition being spaced from said outer wall of said sedimentation chamber to define a second narrow flow passage therebetween and the lower end being spaced above said transverse plate to define a third narrow flow passage therebetween.

16. The device according to claim 15 wherein said transverse plate has an adjustable extension at its lower end and said auxiliary partition has adjustable means at its upper and lower ends so that the cross-sectional area of said first, second and third narrow flow passages can be varied.

17. The device according to claim 16 including means separating first and second portions of said sedimentation means to suppress turbulence in said sediment collection means.

18. The device according to claim 16 including a plurality of spaced guiding partitions positioned in said supply conduit with the bottoms thereof spaced above the inlet to said sedimentation chamber to define a stabilizing zone therebetween, the vertical axis of said guiding partitions being arranged at an angle corresponding to that of the walls of said supply conduit.

19. The device according to claim 18 wherein the cross-sectional area of said supply conduit diverges toward said sedimentation chamber.

20. The device according to claim 17 wherein said sediment collection means comprises a single chamber and said separation means comprises a partition extending downwardly from said transverse plate into said sediment collection chamber to separate said first and second portions thereof.

21. The device according to claim 17 wherein first and second portions of said sediment collecting means and said sediment collection means comprise separate collection chambers which are physically separated from each other.

* * * * *

PO-1050
(5/69)

UNITED STATES PATENT OFFICE
CERTIFICATE OF CORRECTION

Patent No. __3,666,111__          Dated __May 30, 1972__

Inventor(s) __Jacob Peilkenrood and Willem L. B. Ambrosius__

It is certified that error appears in the above-identified patent and that said Letters Patent are hereby corrected as shown below:

On page 1 under Foreign Application Priority Data insert the following after "Sept. 29, 1969 Netherlands. . . . . . . .6914731" - Nov. 17, 1969 Netherlands . . . . . . . . .6917229.

Signed and sealed this 9th day of January 1973.

(SEAL)
Attest:

EDWARD M. FLETCHER, JR.
Attesting Officer

ROBERT GOTTSCHALK
Commissioner of Patents